US 6,536,827 B2

(12) United States Patent
Oswald et al.

(10) Patent No.: US 6,536,827 B2
(45) Date of Patent: Mar. 25, 2003

(54) FLEXIBLE PICK-UP BOX LINER

(75) Inventors: Lawrence J Oswald, Bloomfield Hills, MI (US); Del C Schroeder, Bloomfield Hills, MI (US); John Sabol, Grosse Pointe Woods, MI (US); William W Doolittle, III, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/766,093

(22) Filed: Jan. 19, 2001

(65) Prior Publication Data

US 2002/0096902 A1 Jul. 25, 2002

(51) Int. Cl.$^7$ ................................................ B62D 33/00
(52) U.S. Cl. ........................ 296/39.2; 296/39.1; 296/43
(58) Field of Search ............................. 296/156, 159, 296/160, 163, 164, 167, 39.1, 39.2, 43; 135/88.01, 88.13, 88.17, 124, 137, 120.2; 224/401, 403, 404

(56) References Cited

U.S. PATENT DOCUMENTS

| | | | | |
|---|---|---|---|---|
| 2,788,238 A | * | 4/1957 | Baird ........................... 296/164 |
| 3,466,082 A | * | 9/1969 | Branch ......................... 296/164 |
| 3,656,494 A | * | 4/1972 | Cornett et al. ............... 135/114 |
| 4,332,265 A | * | 6/1982 | Baker ........................... 296/159 |
| 4,444,427 A | * | 4/1984 | Martin .......................... 224/403 |
| 4,657,299 A | | 4/1987 | Mahan .......................... 296/159 |
| 4,807,924 A | * | 2/1989 | Kottke .......................... 296/164 |
| 4,830,036 A | * | 5/1989 | Sanders ..................... 135/88.17 |
| 4,877,281 A | * | 10/1989 | Altmann ...................... 296/39.1 |
| 4,917,431 A | * | 4/1990 | McDonald .................. 296/39.1 |
| 4,986,590 A | * | 1/1991 | Patti et al. ................... 296/39.2 |
| 5,050,924 A | | 9/1991 | Hansen ..................... 296/100.15 |
| 5,197,505 A | * | 3/1993 | Tate ............................. 135/120 |
| 5,353,826 A | | 10/1994 | Davis, Sr. ................. 135/88.13 |
| 5,378,034 A | * | 1/1995 | Nelsen ......................... 296/39.2 |
| 5,641,192 A | * | 6/1997 | Smith et al. ........... 135/88.13 X |
| 5,732,726 A | * | 3/1998 | Lee .............................. 135/124 |
| 5,806,909 A | * | 9/1998 | Wise ........................... 296/39.1 |
| 6,206,443 B1 | * | 3/2001 | Konop et al. ............... 296/39.1 |
| 6,276,382 B1 | * | 8/2001 | Bindschatel ................. 135/96 |
| 6,293,893 B1 | * | 9/2001 | Truchelut .................... 482/121 |

* cited by examiner

*Primary Examiner*—D. Glenn Dayoan
*Assistant Examiner*—Lori L Coletta
(74) *Attorney, Agent, or Firm*—Mark P Calcaterra

(57) ABSTRACT

A flexible pick-up box enclosable liner for use in a motor vehicle having a pick-up box rear compartment. The flexible pick-up box liner includes an enclosable liner arranged to form a base portion, several sidewalls, and an upper portion, which collectively define an internal compartment, as well as an adjustable fastener system for selectively reducing and expanding the volume of the internal compartment. The liner preferably includes several fasteners for attaching the liner to a pick-up box, and a structural support system for retaining the upper portion of the liner.

14 Claims, 6 Drawing Sheets

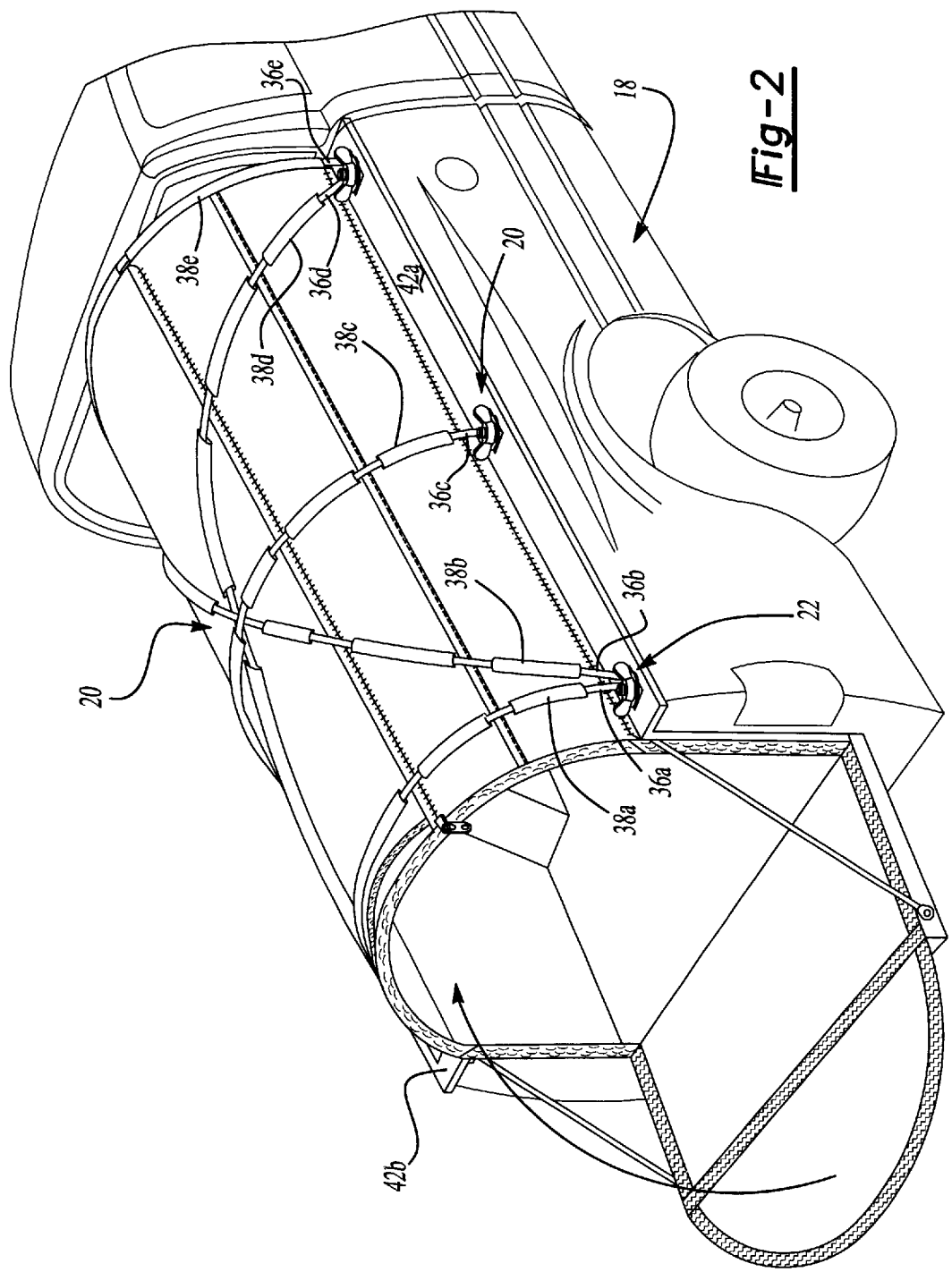

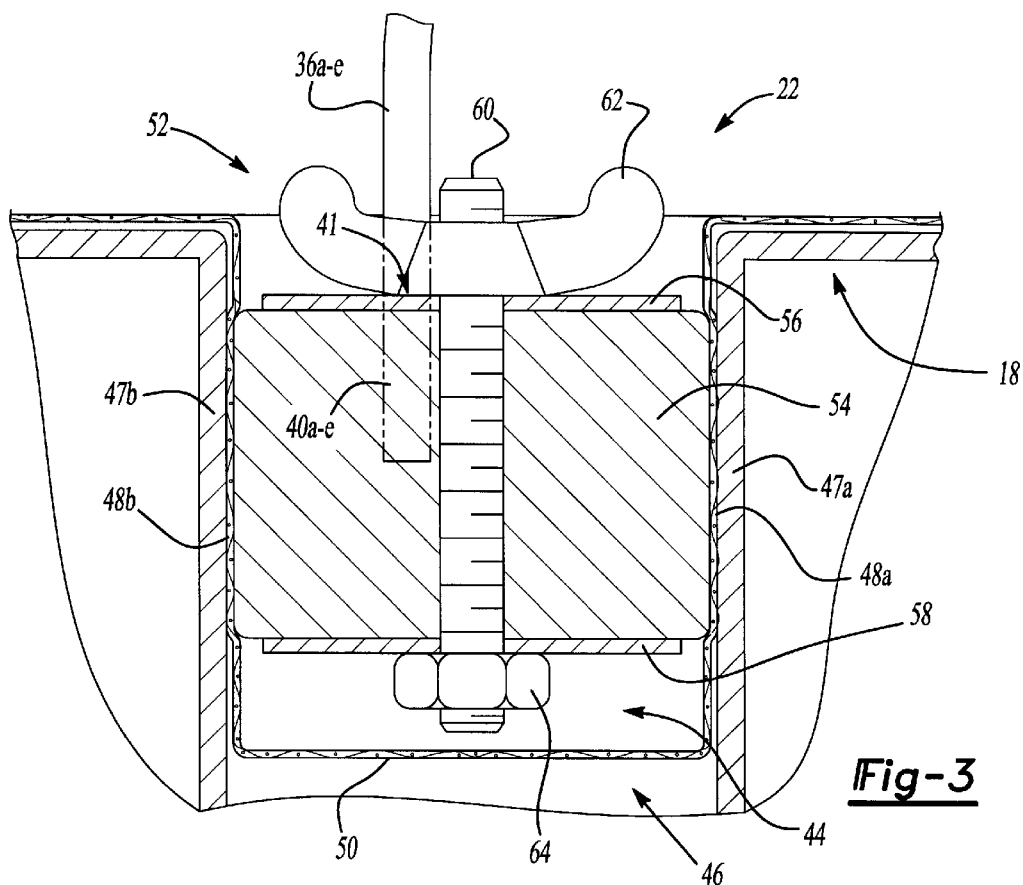
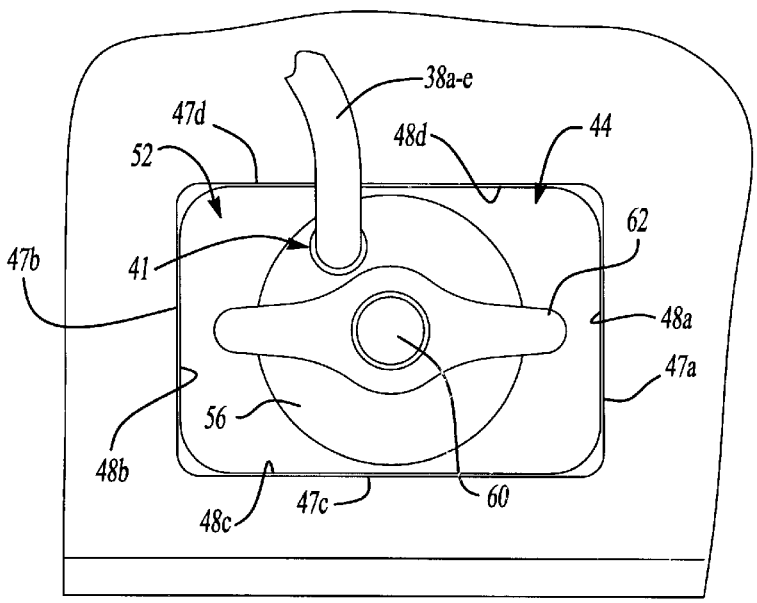

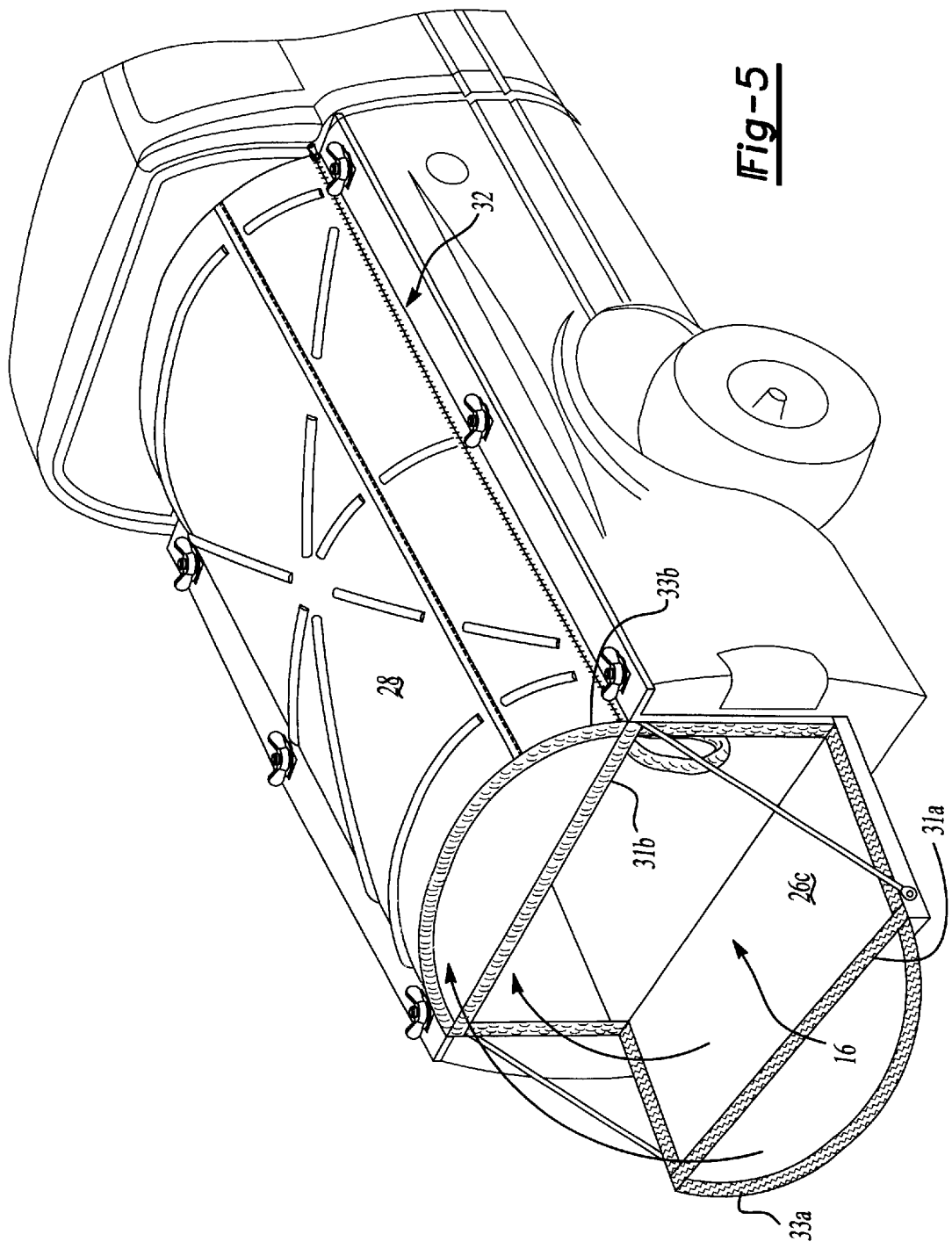

FLEXIBLE PICK-UP BOX LINER

FIELD OF THE INVENTION

The present invention relates generally to a device for covering and protecting a pick-up box rear compartment and more particularly to a flexible pick-up box cover, which is adaptable to form around a variety of transportable objects, and which has a selectively variable volume.

BACKGROUND OF THE INVENTION

The design of a pick-up box or truck bed allows a motor vehicle to transport a variety of materials within the rear pick-up box compartment. The size and accessibility of the pick-up box allows anything from dirt to large bulky objects to be carried within the pick-up box. Even though the pick-up box configuration provides an automobile with an adaptable utility transportation compartment, it does not afford much protection to articles being transported, nor is the pick-up box itself protected very well from wear associated with transporting, loading, and unloading cargo.

In order to properly protect cargo and the interior of the pick-up box, tarps, toppers, tonneau covers, and bed liners, are commonly used. Each of these provides varying degrees of protection to either or both the cargo and the interior of the pick-up box, but they each also have their disadvantages.

Tarps or other similar coverings are often used to cover large or odd-shaped cargo while in a pick-up box. They provide a large degree of versatility, but they do not completely protect the cargo from environmental elements, and they offer little protection to the inside of the pick-up box. They also must be tied down or otherwise specially secured whenever cargo is transported. Additionally, they typically degrade rapidly over time as they are subjected to wind, snow, rain, and other environmental conditions.

Rigid covers, such as toppers, are often used to protect medium to large-sized cargo. Compared with tarps, toppers can more completely cover many types of cargo, they are more durable, and they protect the inside of the pick-up box from environmental elements, but they are rigid and can not accommodate large or odd-sized cargo. Additionally, they do not protect the inside of the pick-up box from movements of the cargo during loading, unloading, or transport.

Removable covers, such as tonneau covers, are commonly used to protect smaller cargo. They have most of the same advantages and disadvantages as toppers, but also have the advantage of being easier to remove than toppers. Tonneau covers, however, are typically only able to protect small sized cargo; for medium, large, or odd-sized cargo, they must be removed.

Pick-up bed liners are commonly used to protect the inside of the pick-up box. However, they do not protect the cargo being transported from environmental elements.

Although there are a variety of pick-up box coverings that protect to some degree or another cargo and/or the internal compartment of a pick-up box, a need exists to have one which protects both the cargo and the pick-up box, is durable, and is adjustable to the needs of the user and the design of the object being transported.

SUMMARY OF THE INVENTION

In order to overcome the foregoing disadvantages associated with the prior art, the present invention provides a durable, yet flexible, pick-up box liner, which protects objects being transported within the pick-up box compartment and the interior of the pick-up box, and which has a selectively variable volume to accommodate various cargo sizes. The preferred embodiment of the present invention is comprised of an enclosable liner arranged to form a base portion, four sidewalls, and an upper portion, which collectively define an internal compartment. The base portion, sidewalls and upper portion are bendable, thereby allowing the liner to fold into a variety of geometric configurations. The geometric configurations provide an internal compartment for the object being transported to be located within. A means for selectively reducing or expanding the volume of the internal compartment is connected to the panels.

The pick-up box liner not only protects the cargo being transported, but protects the pick-up box as well. The bottom portion of the enclosable liner reflects the size and shape of the pick-up box and protects the internal surface of the pick-up box from being damaged during loading, unloading and transporting of cargo. The sidewalls of the enclosable liner also reflect the size and shape of the pick-up box sidewalls, additionally protecting the internal surfaces of the pick-up box sidewalls from being damaged during loading, unloading, and transporting of cargo.

In the expanded volume configuration of the preferred embodiment, the pick-up box liner has a tent-like configuration. This configuration may be disposed over the pick-up box compartment, and is preferably attached to the pick-up box by a plurality of fasteners. The tent-like portion includes the upper portion, and may comprise a fabric or plastic-like material. Because the liner is flexible in nature, it may be supported across the compartment by using structural hoops. This tent-like embodiment gives the pick-up box, compartment a dome-like appearance on top, and additionally provides a large internal compartment for transporting large sized cargo. In the reduced volume configuration of the preferred embodiment, the pick-up box liner has a tonneau cover-like configuration. This configuration may also be disposed over the pick-up box compartment and attached by a plurality of fasteners. The upper portion in this configuration is substantially flat, and provides a smaller internal compartment for transporting small-sized cargo.

In the preferred embodiment, the means for reducing or expanding the volume of the internal compartment comprises the first half of a zipper located along one side of the upper portion, which attaches to the second half of the zipper located substantially mid-way along the upper portion, parallel to the first zipper half. In order to reduce the volume of the truck-box liner, the zipper is zipped, and the area of the upper portion located between the two zipper halves is folded thereunder, being stored in the internal compartment.

In order to attach the liner to the pick-up box, the enclosable liner preferably includes a pair of longitudinal flaps. One flap is located on each side of the liner, and has a plurality of pockets formed therein. Each pocket is adapted to be received into a corresponding securement recess formed in the top surface of a pick-up box sidewall. After each pocket is inserted into a corresponding securement recess of a pick-up box sidewall, a fastener, preferably comprising a securement mechanism, is inserted into each pocket. Each securement mechanism is engaged to securely attach each flap to a pick-up box sidewall.

In the preferred embodiment, the securement mechanism includes a securement compression plug inserted into each pocket, which, when vertically compressed, expands laterally to retain the corresponding pocket walls against the corresponding securement pick-up box recess walls. In an alternate embodiment, the attachment mechanism includes a plurality of securement compression plugs attached to an attachment board.

In any configuration or embodiment, the pick-up box protective covering provides a device which can be used in correlation with a pick-up box (also referred to as a truck bed) to protect cargo being transported. The use of a flexible pick-up truck box cover and liner protects the bed surface while providing a "packaging cocoon" for the protection of a variety of goods during transit.

Additionally, because the ability to transform an open air truck bed compartment into a rear hatch is becoming more and more popular (i.e. similar to a sport utility vehicle (SUV) or minivan), the present invention transforms the bed of a pick-up truck into a motor vehicle having similar functionality as the rear hatch found in an SUV, van, or minivan.

BRIEF DESCRIPTION OF THE DRAWINGS

FIG. 2 is a perspective view of the flexible pick-up box liner in the expanded volume configuration, located within a pick-up box and having structural supports installed;

FIG. 3 is a cross-sectional view of an attachment fixture installed in a pocket of the enclosable liner, which pocket is positioned within an installation cavity of a pick-up box sidewall;

FIG. 4 is an overhead plan view of an attachment fixture installed in a pocket of the enclosable liner, which pocket is positioned within an installation cavity of a pick-up box sidewall;

FIG. 5 is a perspective view of the flexible pick-up box liner in a reduced volume configuration;

DETAILED DESCRIPTION OF THE DRAWINGS

Figure 1:
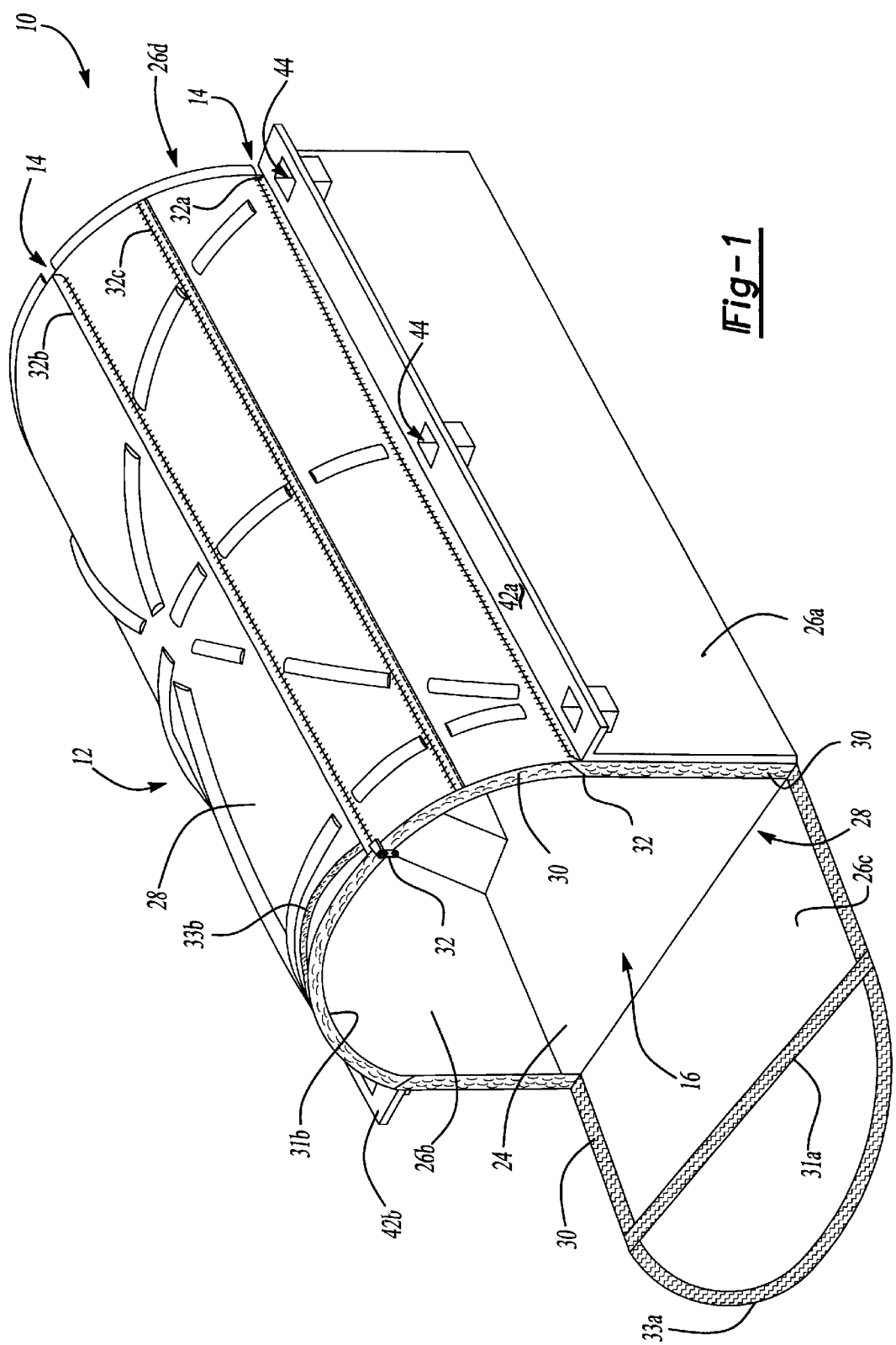
FIG. 1 is a perspective view of the flexible pick-up box liner in the expanded volume configuration.

Referring now to FIGS. 1 and 2, the flexible pick-up box liner 10 is comprised of an enclosable liner 12 and an adjustable fastener system 14. The enclosable liner provides an internal compartment 16, which can hold a variety of objects, and which can transport these objects when the liner 10 is located within the box compartment of a pick-up box 18 (shown in FIG. 2). Furthermore, the pick-up box liner 10 serves as a protective covering for a variety of objects that may be contained within the pick-up box compartment. The adjustable fastener system 14 allows the volume of the internal compartment 16 to be selectively reducible and expandable, thereby allowing the pick-up box liner 10 to accommodate cargo of various sizes and shapes.

In the preferred embodiment, the liner includes an optional structural support system 20, which buttresses the enclosable liner 12 to retain a desired tent-like shape while in the expanded configuration. Additionally, the preferred embodiment includes a plurality of fasteners 22 for attaching the enclosable liner 12 to the rear compartment of a pick-up box 18.

The enclosable liner 12 may be constructed in a variety of methods, which may include the use of a fabric, metal, plastic, wood, or combinations thereof. The enclosable liner is arranged to form a base portion 24, a plurality of sidewalls 26a, 26b, 26c, and 26d, and an upper portion 28 (the base portion, sidewalls, and upper portion being collectively known as "panels"). The panels are designed to be constructed in a variety of ways known in the art, and attached to one another using a variety of means that results in hingedly connected panels. One method of constructing the enclosable liner may include molding the panels out of plastic and hingedly attaching them to one another. An additional method may include framing each of the panel members with metal and stretching a fabric-like material over the frames.

In the preferred embodiment, the panel members are made of fabric comparable to that commonly found in tents, such as canvas treated to be weather resistant or nylon fabric treated to form Gore-Tex®. In order to optimize protection from rain and other adverse weather conditions, the enclosable liner in the preferred embodiment is cut from a unitary piece of fabric, and sewn into the desired configuration. The liner may, however, comprise many panels and fabric pieces sewn together, or even panels removably attached using zippers, Velcro®, or the like. As can be seen, a variety of methods may be used in the construction of the enclosable liner.

The panels of the enclosable liner 12 are designed to reflect the size and shape of the rear portion of a pick-up box 18. The front sidewall 26d (not shown) and the rear sidewall 26c of the enclosable liner 12 are disposed in the front and rear portions of the pick-up box compartment 18, respectively. The rear sidewall 26c is preferably taller than the respective portion of the pickup box in order to accommodate both an expanded volume configuration and a reduced volume configuration, and forms a door to allow access to the internal compartment 16 of the enclosable liner 12.

In order to form a door, the rear sidewall 26c is hingedly connected along its bottom edge 28 to the base portion 24 of the enclosable liner 12. In a closed configuration, the rear sidewall is attached to the lateral sidewalls 26a and 26b, as well as the upper portion 28, through an attachment mechanism 30. The attachment mechanism 30 preferably consists of a hook and loop attachment mechanism, although any known type of fastener may be used, such as a zipper, snaps, or buttons.

The adjustable fastener system 14 allows the volume of the internal compartment 16 to be selectively reducible and expandable. The adjustable fastener system is disposed on the upper portion 28 of the enclosable liner 12, and preferably includes a zipper 32. A first half 32a of the zipper 32 is preferably attached along one lateral side portion of the enclosable liner 12, extending substantially along the entire length of the upper portion 28. A corresponding second half 32b of the zipper 32 is preferably attached along a mid-portion of the enclosable liner 12, opposed to the first half 32a. A corresponding third zipper half 32c is attached between the first and second zipper halves 32a, 32b; opposed to the first half 32a.

As shown in FIG. 5, the volume of the internal compartment 16 is selectively reduced by bringing the first half 32a and either of the second half 32b third half 32c of the zipper 32 together in a zipped configuration, thereby shortening the width of the upper portion 26 and reducing the volume of the internal compartment 16. The volume is conversely selectively expanded by unzipping the zipper 32, and disposing the first half 32a of the zipper 32 apart from the second half 32b or third half 32c. In the reduced volume configuration, the panel section 34 of the upper portion 28 disposed between the zipper halves 32a and b, is folded under the zipper 32, and stored in the internal compartment 16 (see FIG. 6).

Although the preferred embodiment includes a zipper, it should be understood that the adjustable fastener system may comprise a hook and loop fastener, buttons, snaps, ties, or other fastener equivalents or combinations thereof. It should also be understood that the adjustable fastener system may be alternatively located along one of the sidewalls 26a–d. It is further appreciated that the pick-up box liner 10 may comprise a plurality of adjustable fastener systems disposed along the upper portion 28, the sidewalls 26a–d, or any combination thereof. It is also appreciated that the adjustable fastener system may comprise multiple corresponding fastener halves, which allow many different volume configurations depending on which adjustable fastener halves are mated together.

Referring now to FIG. 2, in the expanded volume configuration of the preferred embodiment, the upper portion 28 of the enclosable liner 12 is supported by a structural support system 20 comprised of multiple structural hoops 36a–e, which give the upper portion 28 structure and dimension. The structural hoops 36a–e may be made of, but are not limited to, metal, plastic, fiberglass, or combinations thereof. Furthermore, the structural hoops 36a–e may have a hoop-like configuration.

In order to provide support, the structural hoops 36a–e are preferably attached to the enclosable liner 12 through hoop sleeves 38a–e. The hoop sleeves are similar to those found in tents, and preferably include a loop of material sewn to the outside of upper portion 28. It is appreciated that the structural hoops 36a–e may alternatively be sewn to the inside of upper portion 28, or may simply be disposed underneath the upper portion 28 in order to provide support, or attached using a variety of fasteners such as hooks, or loops.

Referring now to FIGS. 3 and 4, in order for the structural supports to retain their hoop configuration and thereby provide structural support, each one of the ends 40a–e of structural hoops 36a–e are preferably retained in a fastener 22, which attaches the enclosable liner 12 to the rear compartment of the pick-up box 18. Each fastener 22 preferably includes at least one hole 41 formed within its top surface for receiving one end 40 of a structural hoop 36. It is appreciated that each end 40 may alternatively be received within holes along the periphery of the pick-up box 18, or within another attachment structure.

For attaching the liner 10, the enclosable liner 12 in the preferred embodiment further includes a pair of opposing flaps 42a and 42b for connecting the enclosable liner 12 to the pick-up box 18; each flap is attached to a corresponding lateral sidewall 26a and 26b. As shown in FIGS. 1–4, each flap includes a plurality of downwardly disposed pockets 44 formed therein. Each pocket 44 is adapted to be received by a corresponding securement recess 46 typically formed within the sidewalls of a pick-up box 18; each securement recess 46 typically having four vertical recess sidewalls 47a–d.

Because the enclosable liner 12 in the preferred embodiment is made of fabric, each flap 42a and b, is also preferably made of fabric, and is attached to the enclosable liner 12 by means of a sewn seam. Each pocket 44 is also preferably made of fabric sewn to form the desired pocket configuration. Each pocket preferably includes four side panels 48a–d, and a bottom panel 50. It is appreciated that pocket designs may vary depending on the make and model of pick-up truck for which the liner 10 is designed, or may include a general design adaptable to most pick-up truck models.

Each pocket is designed to receive a fastener 22, which securely attaches the enclosable liner 12 to the pick-up box 18. In the preferred embodiment, each fastener 22 is comprised of a securement compression plug 52, which is designed to laterally expand within a corresponding pocket 44, thereby clamping side panels 48a–d of a corresponding pocket 44 against the recess sidewalls 47a–d. Each securement compression plug 52 includes a compressible body 54, which is preferably made from synthetic rubber or similar compressible material, an upper compression washer 56, a lower compression washer 58, a bolt 60, a wingnut 62, and a lower nut 64.

The compression plug 52 is similar to those found in industry, and operates according to Poisson's ratio, wherein a percent decrease in the vertical height of the compressible body 54 as the plug is compressed, is expressed in a related increase of the cross-sectional area of the compressible body 54. In order to compress the compressible body 54, the wingnut 62 is twisted clockwise about the bolt 60. The nut 64 is preferably fixedly attached to the lower compression washer 58 by means of a weld, which prevents the nut 64 from rotating. As the wingnut 62 is twisted clockwise, the wingnut is drawn down along the bolt 60. As the wingnut is drawn down, it forces the upper compression washer 56 down against the compressible body 54. The compressible body 54 is thereby sandwiched between the washers 56 and 58, and compressed. As the compressible body 54 is vertically compressed, its cross-sectional area increases, which acts to clamp the side panels 48a–d of a corresponding pocket 44 against the recess sidewalls 47a–d.

Although the preferred embodiment details a particular method of securing the enclosable liner 12 within the pick-up box 18, it is appreciated that there are a variety of other ways to secure the liner. The liner 10 may alternatively be secured through the use of attachment mechanisms such as tie-downs attachments, hook and loop attachments, elastic straps, fasteners, and any other type of attachment mechanism known in the art.

In certain circumstances it may be desirable to leave the pick-up box liner unsecured, merely retained by the tailgate and the walls of the pick-up box. This may also be desirable for carrying odd-shaped cargo that does not fit within the enclosable liner 12, in which case the pick-up box liner may simply serve as a bedliner, with cargo being placed thereon. It may also be desirable to have the pick-up box liner 10 unsecured when the odd-shaped cargo is loaded, such as when the shape of the cargo requires the sidewalls to be unsecured in order to allow full flexibility of the enclosable liner 12.

In the preferred embodiment, upon placing the pick-up box liner 10 within a truck bed compartment 12, the base portion 24 of the enclosable liner 12 is placed upon the floor of the truck bed compartment resulting in the lateral sidewalls 26a and b of the enclosable liner 12 fitting against the corresponding side walls of the truck box 18. The lateral sidewalls 26a and b, and the base portion 24 may be specially formed to fit around the wheel wells that typically protrude into the truck bed compartment.

In this preferred embodiment, the flaps 42a and b are placed upon the corresponding top rails of the truck box sidewalls, and the pockets 44 formed therein are received within corresponding securement recesses 46. Fasteners consisting of securement compression plugs 52 are received within the pockets 44 for securing the enclosable liner 12 within the pick-up box 18. In order to secure the enclosable liner 12, the plugs 52 are vertically compressed as described above, thereby laterally expanding to clamp the pocket side panels 48a–d against the side walls of the corresponding pick-up box securement recess.

In the expanded volume configuration of the preferred embodiment, the enclosable liner 12 is supported by a structural support system 20 comprised of multiple structural hoops 36a–e. The hoops 36a–e are installed by threading each one through a corresponding hoop sleeve 38a–e, and then installing each hoop end 40a–e into a corresponding hole 41 formed within the top surface of a corresponding compression plug 52. Each compression plug 52 retains the corresponding end 40a–e, thereby maintaining each hoop 36a–e in an arch configuration, which in concert with the other hoops, holds the upper portion 28 of the enclosable liner 12 in a tent-like configuration. The hoops 36a–e can be adjustably telescoping or can be fixed in length.

While in this expanded volume configuration, large and odd-sized cargo is easily loaded or unloaded into the internal compartment 16 through the rear of the pick-up box liner. The rear sidewall 26c acts as a door, and while in its position, provides access to the internal compartment 16. Once the desired cargo is placed within the internal compartment 16, the rear sidewall door 26c may be closed. When in the closed position, the rear sidewall door 26c is secured to the lateral sidewalls 26a and b, and the upper portion 28, by means of attachment mechanism 30.

Figure 6:
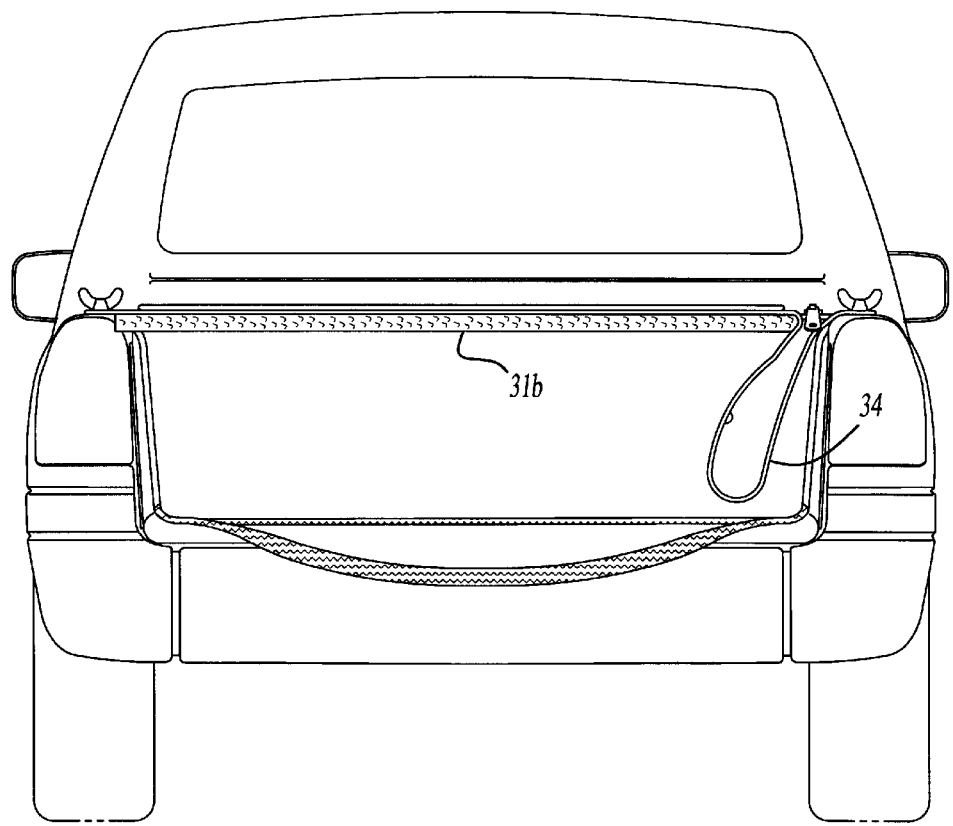
FIG. 6 is a rear view of the flexible pick-up box liner in a reduced configuration.

Referring now to FIGS. 5 and 6, the reduced volume configuration of the preferred embodiment is shown. In order to change the pick-up box liner to the reduced volume configuration, the structural hoops 36a–e are removed, and the adjustable fastener system 14 is modified for the reduced volume configuration. The adjustable fastener system 14 in the preferred embodiment comprises a zipper. In the reduced configuration, the zipper 32 is zipped, and panel section 34 located between the zipper halves is folded and stored under the zipper 32 in the internal compartment 16. When the zipper 32 is zipped, the width of upper portion 28 is reduced, and the volume of the internal compartment 16 is thereby reduced.

In this configuration, the pick-up box liner 10 resembles a tonneau cover; however, as opposed to a conventional tonneau cover, the present invention completely encloses the cargo. This more completely protects the cargo, and also protects the interior of the pick-up box from damage related to loading, unloading, or carrying cargo.

In the reduced volume configuration, the internal compartment 16 is also accessed through the rear of the liner 10, when the rear sidewall door 26c is in an open position. In order to fully enclose the cargo, the rear sidewall door 26c is placed in a closed position. The rear sidewall door 26c is retained in the closed position by securing it to the enclosable liner lateral sidewalls 26a and b, and upper portion 28, by means of attachment mechanism 30. Attachment mechanism 30 preferably includes attachment portions 31a and b for attaching to the upper portion 28 in the reduced volume configuration, and attachment portions 33a and b for attaching to the upper portion 28 in the expanded volume configuration.

In the preferred embodiment, the rear sidewall 26c is taller than the corresponding tailgate of the pick-up box 18, thereby allowing the rear sidewall 26c to mate with the tent-like dome-shaped upper portion 28 in the expanded volume configuration. In the reduced volume configuration, the rear sidewall 26c preferably mates with the upper portion 28 along a mid-region attachment portion 31a, and the upper region attachment portion 33a preferably overlaps the top of the upper portion 28, as shown by the arrows in FIG. 5.

Figure 8:
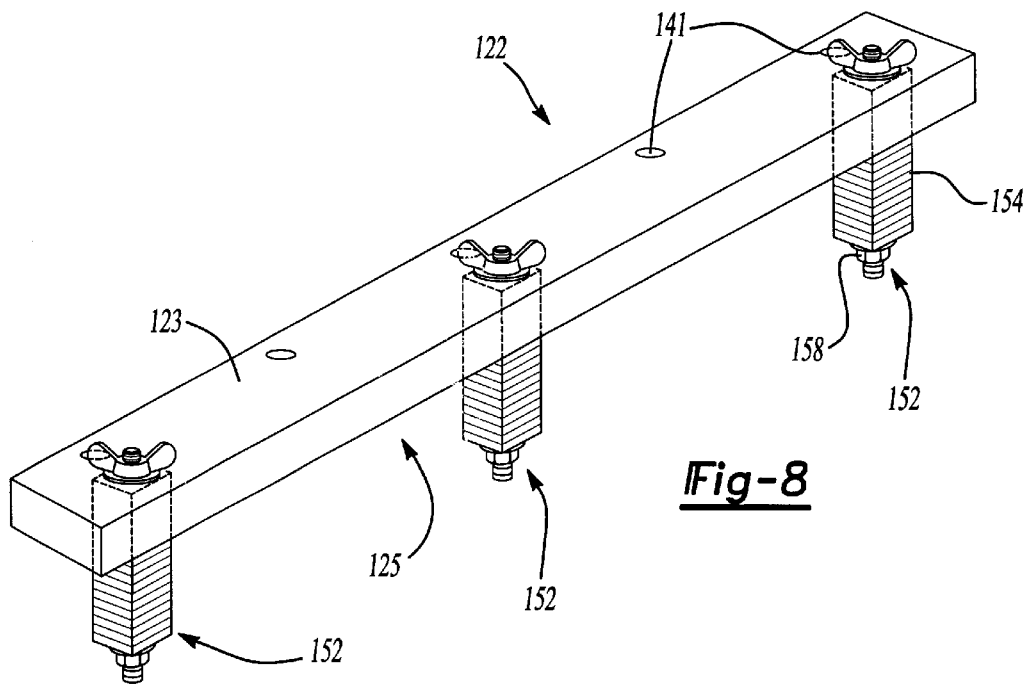
FIG. 8 is a perspective, view of the second embodiment of the flexible pick-up box liner.
Figure 7:
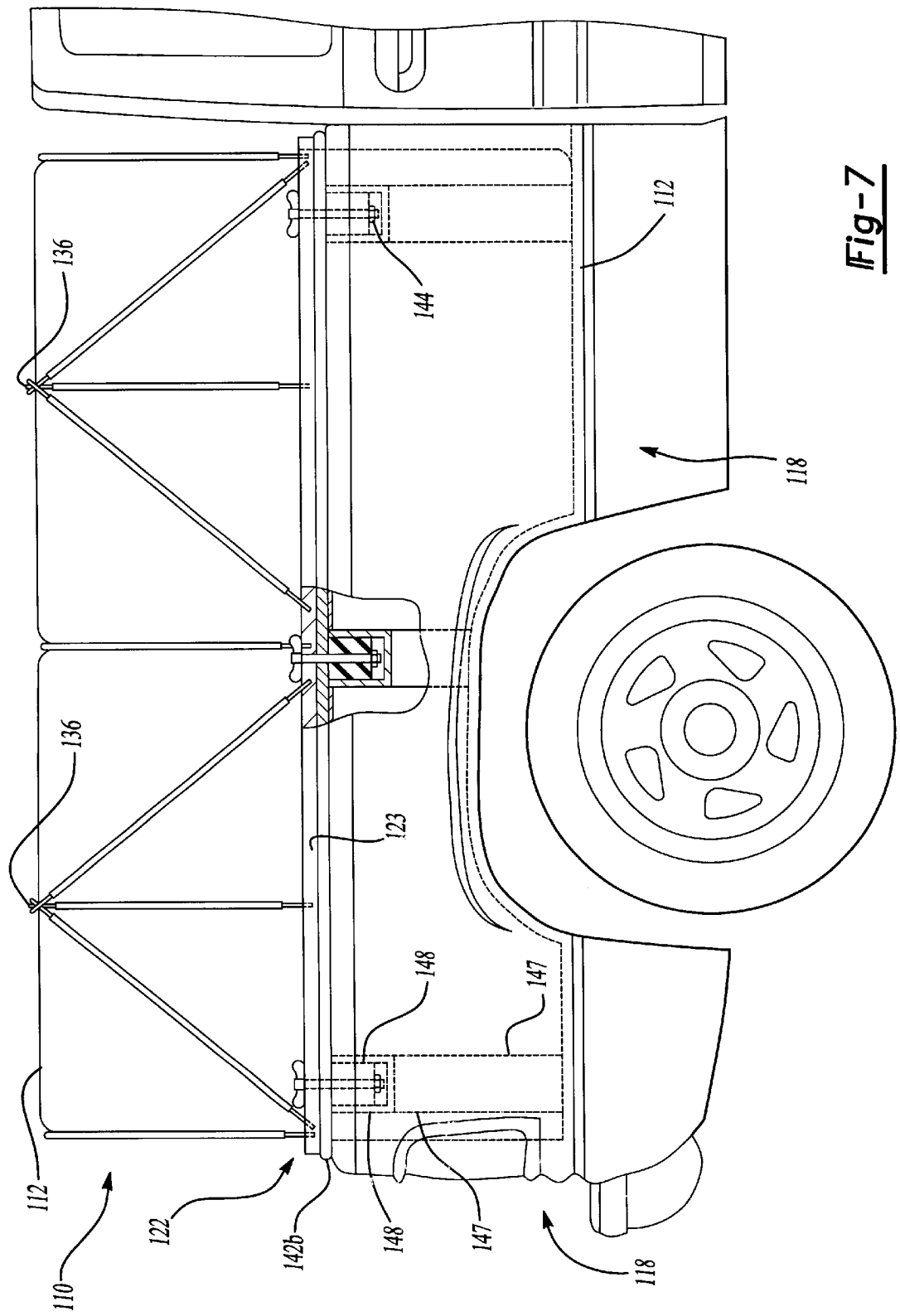
FIG. 7 is a side view of the second embodiment of the flexible pick-up box liner, showing use of an alternative plurality of fasteners, and an alternative structural support configuration.

Referring now to FIGS. 7 and 8, the flexible pick-up box liner 110 is shown in a second embodiment thereof. The second embodiment includes all aspects, options, and advantages of the preferred embodiment, except that it comprises a different plurality of fasteners 122 for attaching the flexible pick-up box liner 110 to a pick-up box 118.

In the second embodiment, the plurality of fasteners 122 includes a pair of opposing boards 123, and a plurality of securement compression plugs 152 attached to one side of each board 123. Each board 123 is preferably made of wood, such as a 2×4 plank, but could also be made from steel, aluminum, metal, plastic, or almost any other rigid or semi-rigid material used in industry. Each securement compression plug 152 is preferably constructed the same as securement compression plug 52 in the first embodiment, except that each one of the boards 123 replaces the upper compression washer 56 of the plurality of compression plugs 152 attached thereto.

In this embodiment, therefore, a number of compression plugs 152 are attached to the lower side 125 of each board 123. The enclosable liner 112 is installed and secured the same as in the preferred embodiment, except that one board fastener 122 is installed over each opposing flap 142a and b. The compression plugs 152 attached to each board attachment 122 are received into corresponding pockets 144 formed in the flaps 142a and b.

In the secured state, each board 123 acts to vertically compress the compressible body 154 sandwiched between the board 123 and the lower compression washer 158. As in the first embodiment, as the compressible body 154 is vertically compressed, its cross-sectional area increases, which acts to clamp the side panels 148 of a corresponding pocket against the recess sidewalls 147 of a pick-up box.

In the second embodiment, the pair of opposing flaps 142a and b of the enclosable liner 112 are each clamped between the corresponding lower side 125 of the corresponding board 123, and a corresponding rail of a pick-up box 118. The flaps 142a and b are thereby additionally secured by this clamping action, which serves to further retain the enclosable liner in the pick-up box 118.

The second embodiment further includes an optional structural support system 120. The support system 120 in this embodiment is substantially the same as the preferred embodiment, except that each board 123 includes a plurality of holes 141 formed within its top surface. Because each board 123 extends along the length of each pick-up box side wall, it allows for more hoop attachment holes 141 to be placed along the length of the enclosable liner 110. The addition of more holes formed within each board 123 allows for more structural hoops 136 in various configurations, which can a impart additional support to the enclosable liner 110.

Following the placement of each of the embodiments of the enclosable liner into rear pick-up box compartment, the tailgate 11 of the truck compartment may be closed. The closing of the truck-bed compartment further secures the enclosable liner within the rear truck-bed compartment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flexible pick-up box liner for use in a motor vehicle having a pick-up box, the liner comprising:

an enclosable liner arranged to form a base portion, a plurality of sidewalls including two lateral sidewalls and two end side walls, and an upper portion, for defining an internal compartment; and an adjustable fastener system disposed on said upper portion for selectively reducing and expanding a volume of said internal compartment, the adjustable fastener system including at least one of:
(i) at least one zipper;
(ii) at least one hook and loop fastening means; and
(iii) a plurality of snaps.

2. The flexible pick-up box liner according to claim 1 further comprising a plurality of fasteners for attaching said flexible pick-up box liner to a pick-up box rear compartment.

3. A flexible pick-up box liner according to claim 2, further comprising a pair of opposing flaps, each of said flaps fixedly attached to one of the sidewalls of said liner, wherein said plurality of fasteners are adapted to secure said flaps to said pick-up box.

4. A flexible pick-up box liner according to claim 3, wherein said flaps further include a plurality of downwardly disposed pockets formed therein, each of said pockets adapted to be received by a corresponding securement recess formed within a pick-up box sidewall, each of said pockets adapted to receive one of said plurality of fasteners.

5. A flexible pick-up box liner according to claim 4, said plurality of fasteners comprising:
a plurality of securement compression plugs, each of said plugs adapted to be received by a corresponding one of said pockets in an uncompressed state, and each of said plugs adapted to laterally expand within said corresponding pocket when in a vertically compressed state.

6. A flexible pick-up box liner according to claim 4, said plurality of fasteners comprising:
a pair of opposing boards, each of said boards disposed on the top side of one of said flaps; and
a plurality of securement compression plugs attached to one side of each of said boards, each of said plugs adapted to be received by a corresponding one of said pockets in an uncompressed state, and each of said plugs adapted to laterally expand within said corresponding pocket when in a vertically compressed state.

7. A flexible pick-up box liner for use in a motor vehicle having a pick-up box, the liner comprising:
an enclosable liner arranged to form a base portion, a plurality of sidewalls including two lateral sidewalls and two end side walls, and an upper portion, for defining an internal compartment;
an adjustable fastener system disposed on said upper portion for selectively reducing and expanding a volume of said internal compartment;
said end walls including a rear wall and a front wall portion, said rear wall providing access to said internal compartment; said rear wall portion comprising:
a rear end door panel hingedly attached to said bottom portion of said liner; and
a fastener for releasably retaining said rear end door panel in a closed configuration;
wherein said rear end door panel provides access to said internal compartment of said flexible pick-up box liner when in an open configuration.

8. A flexible pick-up box liner according to claim 7, wherein said fastener includes a hook and loop fastening means.

9. A flexible pick-up box liner according to claim 7, wherein said fastener includes a zipper.

10. A flexible pick-up box liner having a tent-like configuration for use in a motor vehicle having a pick-up box, the flexible pick-up box liner comprising:

a material component including a base portion, a plurality of sidewalls, and an upper portion, for defining an internal compartment;

a structural support system including a plurality of structural hoops for supporting said upper portion of said material component;

a means for selectively reducing and expanding the volume of said internal compartment; and a plurality of fasteners for attaching said flexible pick-up box liner to a pick-up box rear compartment and retaining said structural hoops.

11. A flexible pick-up box liner according to claim 10, wherein said structural hoops are comprised of a material selected from the group consisting of metal, plastic, fiberglass or combinations thereof.

12. A flexible pick-up box liner according to claim 10, further including
at least a pair of opposing flaps, each of said flaps including a pocket formed therein, each of said flaps attached to one of the sidewalls of said liner, the plurality of fasteners adapted to secure said flaps to the pick-up box, said plurality of fasteners comprising:
a pair of opposing boards, each of said boards disposed on a top side of one of said flaps, each said board adapted to retain at least one end of one of said hoops;
a plurality of securement compression plugs attached to one side of each said board, each said plug adapted to be received by a corresponding one of said pockets in an uncompressed state, and each said plug adapted to laterally expand within said corresponding pocket when in a vertically compressed state.

13. A flexible pick-up box liner for use in a motor vehicle having a pick-up box, the liner comprising:
an enclosable liner arranged to form a base portion, a plurality of sidewalls, and an upper portion, for defining an internal compartment;
said upper portion selectively movable between a collapsed position to reduce a volume of said internal compartment and an uncollapsed position to expand said volume of said internal compartment; and
an adjustable fastener system for selectively fastening said upper portion of said enclosable liner to a lower portion of said enclosable liner to fasten said upper portion in said collapsed position and for selectively unfastening said upper portion of said enclosable liner from said lower portion to allow said upper portion to move to said uncollapsed position.

14. A flexible pick-up box liner having a tent-like configuration for use in a motor vehicle having a pick-up box, the flexible pick-up box liner comprising:
a material component including a base portion, a plurality of sidewalls, and an upper portion, for defining an internal compartment;
a structural support system for supporting said upper portion of said material component; and
a means for selectively fastening and unfastening a first portion of said material component to a second portion of said material component to reduce and expand the volume of said internal compartment.

* * * * *